United States Patent [19]
Brandin

[11] Patent Number: 6,167,400
[45] Date of Patent: Dec. 26, 2000

[54] METHOD OF PERFORMING A SLIDING WINDOW SEARCH

[75] Inventor: Christopher Lockton Brandin, Colorado Springs, Colo.

[73] Assignee: NEO-Core

[21] Appl. No.: 09/334,043

[22] Filed: Jun. 15, 1999

Related U.S. Application Data

[60] Provisional application No. 60/094,968, Jul. 31, 1998.

[51] Int. Cl.$^7$ ............................................. G06F 7/02
[52] U.S. Cl. ................................................... 707/6
[58] Field of Search .................. 707/3, 5, 6; 708/209

[56] References Cited

U.S. PATENT DOCUMENTS

5,051,947  9/1991  Messenger et al. .......................... 707/3
5,497,488  3/1996  Akizawa et al. ............................ 707/6

*Primary Examiner*—P V. Kulik
*Attorney, Agent, or Firm*—Dale B. Halling

[57] ABSTRACT

A method of performing a sliding window search includes the steps of: (a) creating an associative database of a plurality of data strings; (b) receiving a first window of a data block; (c) iconizing the first window of the data block to form a first icon; (d) determining if the first icon has a match in the associative database; (e) determining a first byte icon of a first byte of data in the first window; (f) executing an icon shift function to form a shifted first byte icon; (g) exclusive ORing the shifted first byte icon with the first icon to form a seed icon; (h) determining a second icon for a second window using the seed icon and transforming a new byte of data onto the seed icon; and (i) determining if the second icon has a match in the associative database.

21 Claims, 11 Drawing Sheets

```
Transform Lookup Table:
  00- 00000000 77073096 EE0E612C 990951BA 076DC419 706AF48F E963A535 9E6495A3
  08- 0EDB8832 79DCB8A4 E0D5E91E 97D2D988 09B64C2B 7EB17CBD E7B82D07 90BF1D91
  10- 1DB71064 6AB020F2 F3B97148 84BE41DE 1ADAD47D 6DDDE4EB F4D4B551 83D385C7
  18- 136C9856 646BA8C0 FD62F97A 8A65C9EC 14015C4F 63066CD9 FA0F3D63 8D0B0DF5
  20- 3B6E20C8 4C69105E D56041E4 A2677172 3C03E4D1 4B04D447 D20D85FD A50AB56B
  28- 35B5A8FA 42B2986C DBBBC9D6 ACBCF940 32D86CE3 45DF5C75 DCD60DCF ABD13D59
  30- 26D930AC 51DE003A C8D75180 BFD06116 21B4F4B5 56B3C423 CFBA9599 B8BDA50F
  38- 2802B89E 5F058808 C60CD9B2 B10BE924 2F6F7C87 58684C11 C1611DAB B6662D3D
  40- 76DC4190 01DB7106 98D220BC EFD5102A 71B18589 06B6B51F 9FBFE4A5 E8B8D433
  48- 7807C9A2 0F00F934 9609A88E E10E9818 7F6A0DBB 086D3D2D 91646C97 E6635C01
  50- 6B6B51F4 1C6C6162 856530D8 F262004E 6C0695ED 1B01A57B 8208F4C1 F50FC457
  58- 65B0D9C6 12B7E950 8BBEB8EA FCB9887C 62DD1DDF 15DA2D49 8CD37CF3 FBD44C65
  60- 4DB26158 3AB551CE A3BC0074 D4BB30E2 4ADFA541 3DD895D7 A4D1C46D D3D6F4FB
  68- 4369E96A 346ED9FC AD678846 DA60B8D0 44042D73 33031DE5 AA0A4C5F DD0D7CC9
  70- 5005713C 270241AA BE0B1010 C90C2086 5768B525 206F85B3 B966D409 CE61E49F
  78- 5EDEF90E 29D9C998 B0D09822 C7D7A8B4 59B33D17 2EB40D81 B7BD5C3B C0BA6CAD
  80- EDB88320 9ABFB3B6 03B6E20C 74B1D29A EAD54739 9DD277AF 04DB2615 73DC1683
  88- E3630B12 94643B84 0D6D6A3E 7A6A5AA8 E40ECF0B 9309FF9D 0A00AE27 7D079EB1
  90- F00F9344 8708A3D2 1E01F268 6906C2FE F762575D 806567CB 196C3671 6E6B06E7
  98- FED41B76 89D32BE0 10DA7A5A 67DD4ACC F9B9DF6F 8EBEEFF9 17B7BE43 60B08ED5
  A0- D6D6A3E8 A1D1937E 38D8C2C4 4FDFF252 D1BB67F1 A6BC5767 3FB506DD 48B2364B
  A8- D80D2BDA AF0A1B4C 36034AF6 41047A60 DF60EFC3 A867DF55 316E8EEF 4669BE79
  B0- CB61B38C BC66831A 256FD2A0 5268E236 CC0C7795 BB0B4703 220216B9 5505262F
  B8- C5BA3BBE B2BD0B28 2BB45A92 5CB36A04 C2D7FFA7 B5D0CF31 2CD99E8B 5BDEAE1D
  C0- 9B64C2B0 EC63F226 756AA39C 026D930A 9C0906A9 EB0E363F 72076785 05005713
  C8- 95BF4A82 E2B87A14 7BB12BAE 0CB61B38 92D28E9B E5D5BE0D 7CDCEFB7 0BDBDF21
  D0- 86D3D2D4 F1D4E242 68DDB3F8 1FDA836E 81BE16CD F6B9265B 6FB077E1 18B74777
  D8- 88085AE6 FF0F6A70 66063BCA 11010B5C 8F659EFF F862AE69 6168FFD3 166CCF45
  E0- A00AE278 D70DD2EE 4E048354 3903B3C2 A7672661 D06016F7 4969474D 3E6E77DB
  E8- AED16A4A D9D65ADC 40DF0B66 37D83BF0 A9BCAE53 DEBB9EC5 47B2CF7F 30B5FFE9
  F0- BDBDF21C CABAC28A 53B39330 24B4A3A6 BAD03605 CDD70693 54DE5729 23D967BF
  F8- B3667A2E C4614AB8 5D681B02 2A6F2B94 B40BBE37 C30C8EA1 5A05DF1B 2D02EF8D
```

FIG. 11

```
Transform Translation Table:
  00-  00  41  C3  82  86  C7  45  04  4D  0C  8E  CF  CB  8A  08  49
  10-  9A  DB  59  18  1C  5D  DF  9E  D7  96  14  55  51  10  92  D3
  20-  75  34  B6  F7  F3  B2  30  71  38  79  FB  BA  BE  FF  7D  3C
  30-  EF  AE  2C  6D  69  28  AA  EB  A2  E3  61  20  24  65  E7  A6
  40-  EA  AB  29  68  6C  2D  AF  EE  A7  E6  64  25  21  60  E2  A3
  50-  70  31  B3  F2  F6  B7  35  74  3D  7C  FE  BF  BB  FA  78  39
  60-  9F  DE  5C  1D  19  58  DA  9B  D2  93  11  50  54  15  97  D6
  70-  05  44  C6  87  83  C2  40  01  48  09  8B  CA  CE  8F  0D  4C
  80-  95  D4  56  17  13  52  D0  91  D8  99  1B  5A  5E  1F  9D  DC
  90-  0F  4E  CC  8D  89  C8  4A  0B  42  03  81  C0  C4  85  07  46
  A0-  E0  A1  23  62  66  27  A5  E4  AD  EC  6E  2F  2B  6A  E8  A9
  B0-  7A  3B  B9  F8  FC  BD  3F  7E  37  76  F4  B5  B1  F0  72  33
  C0-  7F  3E  BC  FD  F9  B8  3A  7B  32  73  F1  B0  B4  F5  77  36
  D0-  E5  A4  26  67  63  22  A0  E1  A8  E9  6B  2A  2E  6F  ED  AC
  E0-  0A  4B  C9  88  8C  CD  4F  0E  47  06  84  C5  C1  80  02  43
  F0-  90  D1  53  12  16  57  D5  94  DD  9C  1E  5F  5B  1A  98  D9
```

FIG. 12

METHOD OF PERFORMING A SLIDING WINDOW SEARCH

This application claims benefit of provisional application 60/094,968, filed Jul. 31, 1998.

FIELD OF THE INVENTION

The present invention relates generally to the field of computers and more particularly to a method of performing a sliding window search.

BACKGROUND OF THE INVENTION

It is commonly required in computers to find a particular string of data. For instance, a user might want to identify all of his documents that have a particular word. The computer creates a window the size of the word and starts searching all the files on the computer's hard disk for the word. Another example is firewalls and anti-virus programs. Unfortunately, the user might be looking for several words of differing lengths or signatures having different lengths. As a result the computer has to create search windows of differing lengths. Assume one search window is three bytes and a second window is four bytes. We have to form two comparisons for each new byte of data. One comparison that contains the new byte of data and two old bytes of data and a second comparison that contains the new byte of data and three old bytes of data. This is a very processor intensive process. Note that if several three byte words (addresses) are being search for, the process requires a comparison for each of these words.

Thus there exists a need for a search process that is faster and less processor intensive. Such a process would have significant commercial value in a variety of applications.

SUMMARY OF THE INVENTION

A method of performing a sliding window search that overcomes these and other problems includes the steps of: (a) creating an associative database of a plurality of data strings; (b) receiving a first window of a data block; (c) iconizing the first window of the data block to form a first icon; (d) determining if the first icon has a match in the associative database; (e) determining a first byte icon of a first byte of data in the first window; (f) executing an icon shift function to form a shifted first byte icon; (g) exclusive ORing the shifted first byte icon with the first icon to form a seed icon; (h) determining a second icon for a second window using the seed icon and transforming a new byte of data onto the seed icon; and (i) determining if the second icon has a match in the associative database.

Using the method described above significantly reduces the number of processor steps and memory look-ups. This significantly increases the speed of a search process. Because searching strings of data for matches is such an integral part of numerous computer functions, the method is an important commercial advancement in the computer art.

BRIEF DESCRIPTION OF THE DRAWINGS

FIG. 11 is an example of a transform lookup table; and

FIG. 12 is an example of a transform translation table.

DETAILED DESCRIPTION OF THE DRAWINGS

Figure 1:
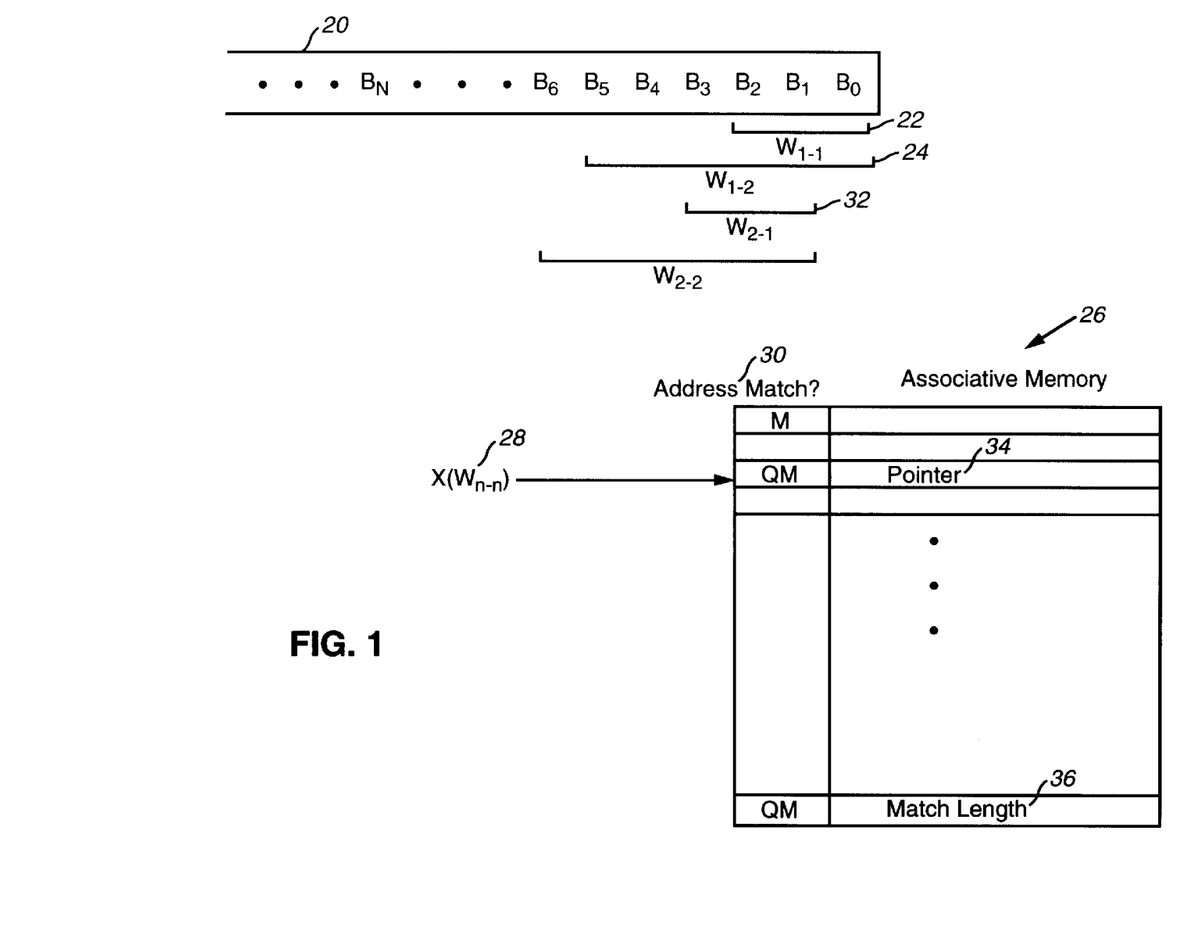
FIG. 1 is a schematic diagram of a sliding window search routine in accordance with one embodiment of the invention.

The present invention significantly reduces the amount of processing required to perform a search for a specific data string(s) in a block of data. This type of search is required in numerous computer applications. The sliding window search of the present invention is applicable to all of these computer applications. FIG. 1 is a schematic diagram of a sliding window search routine in accordance with one embodiment of the invention. A data block 20 to be searched is represented as $B_0$, $B_1$, $B_2$–$B_n$, where $B_0$ may represent a byte of data. A first window 22 ($W_{1-1}$) has a search window size of three bytes. The search window size, in one embodiment, is equal to the size of one of the plurality of data strings for which we are searching. Another window 24 ($W_{2-1}$) has a search window size of five bytes. An associative database (associative memory) 26 consists of a plurality of address $\{X(W_{n-n})\}$ 28. In one embodiment, the transform of each of the plurality of data strings corresponds to one of the addresses 28 of the associative memory 26. In another embodiment, a transform for at least a first portion of each of the plurality of data strings corresponds to one of the addresses 28 of the associative memory 26. In one embodiment, the transform is a cyclical redundancy code for the plurality of data strings or first portion of the plurality of data strings. In another embodiment, the transform is any linear feedback shift register transformation (polynomial code) of the data string. Generally the polynomial code is selected to have as few collisions as possible.

In one embodiment, a transform (icon) is determined for the first window 22 $\{X(W_{1-1})\}$. Then the address 28 in the associative database equal to the first window transform is queried. The first entry at the address is a match indicator 30. There are three possible states for the match: no match, match (M) and qualified match (QM). When a match occurs this information is passed to a user (operating system) for further processing. When a no match state is found the window slides by one byte for example. This is shown as window $W_{2-1}$ 32. The subscript one means its the first size window (three byte size) and the subscript two means its the second window. Note the window has slid one byte to cover bytes $B_1$, $B_2$, $B_3$. Prior art techniques, such as hashing, would require determining a completely new transform for the bytes $B_1$, $B_2$, $B_3$. The present invention however uses advanced transform techniques for linear feedback shift registers that are explained in the patent application entitled "Method and Apparatus for Generating a Transform"; Ser. No. 08/613,037; filed Mar. 8, 1997; assigned to the same assignee as the present application and incorporated herein by reference. These advanced transform techniques are also explained in detail with respect to FIGS. 7–11. Using these advanced techniques a transform (first byte icon) is calculated for a first byte of data ($B_0$). An icon shift function is performed on the first byte icon to form a shifted first byte icon. Note the shifted first byte icon is $X(B_0\ 0\ 0)$ in this case, where 0 0 represents two bytes of zeros. Note that this discussion also assumes that $B_0$ is the highest order byte.

The shifted first byte icon $X(B_0\ 0\ 0)$ is exclusive ORed with the first icon $X(B_0\ B_1\ B_2)$ to form a seed icon $X(B_1\ B_2)$. Next a second icon $X(B_1\ B_2\ B_3)$ is formed by transforming a new byte of data ($B_3$) onto the seed icon $X(B_1\ B_2)$. The process of transforming a new byte of data onto an existing transform is explained with respect to FIG. 9. In another embodiment, the seed icon is icon shifted to form a shifted seed icon $X(B_1\ B_2\ 0)$. The shifted seed icon $X(B_1\ B_2\ 0)$ is exclusive ORed with the icon for the new byte of data $X(B_3)$ to form the second icon $X(B_1\ B_2\ B_3)$. Now the second icon represents an address in the associative memory, so we can determine if there is a match for the data ($B_1\ B_2\ B_3$). This process then repeats for each new byte of data.

Using this process significantly reduces the processing time required to determine a match. Note that if the process is searching for several three bytes strings it requires the same number of steps as searching for a single three byte string of data. This is because each new data string just represents a different entry in the associative database 26. Whereas standard compare functions would have to perform a comparison for each data string being searched. Thus this invention is particularly helpful where numerous data strings need to be matched.

Often the data strings for which we are searching have differing lengths. In one embodiment this is handled by defining a separate window search size (e.g., $W_{2-1}$ 24). The two or more window sizes operate completely independently as described above. In another embodiment, the associative database 26 contains a qualified match for a first portion of each the data strings that are longer than the window length. Note in this case the window length (window size) is selected to be equal to the shortest data string being searched. When the process encounters a qualified match, two alternative implementations are possible. In one implementation, there is a pointer 34 associated with the qualified match. The pointer points to a second icon. The process determines an icon for a next window of data. When the icon for the next window of data matches the second icon a match has been found. Note that this technique can be extended for data strings that have sizes that are many times longer than the window size. However, this implementation is limited to data sizes that are multiples of the window size. This may be limiting in some situations. The second implementation has a match length 36 associated with the qualified match. The match length indicates the total length of the data string to be matched. Then an icon can be determined for the complete data string or for just that portion of the data string that does not have an icon. Using this icon the process can determine if there is match. Using these methods it is possible to handle searches for data strings having varying lengths. This method provides a significant improvement over comparison search techniques, that have to perform multiple comparisons on the same data when differing window lengths are involved.

Figure 2:
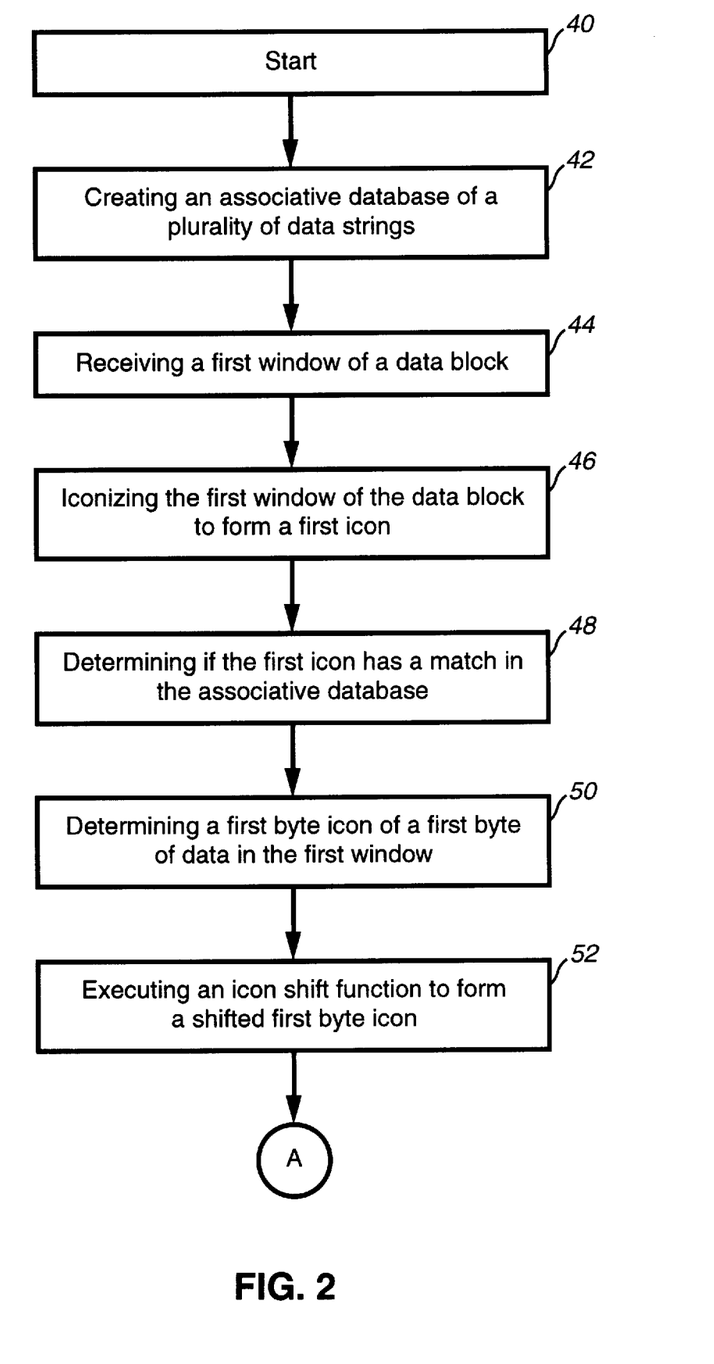
FIGS. 2 & 3 are a flow chart of the steps used in performing a sliding window search in accordance with one embodiment of the invention.
Figure 3:
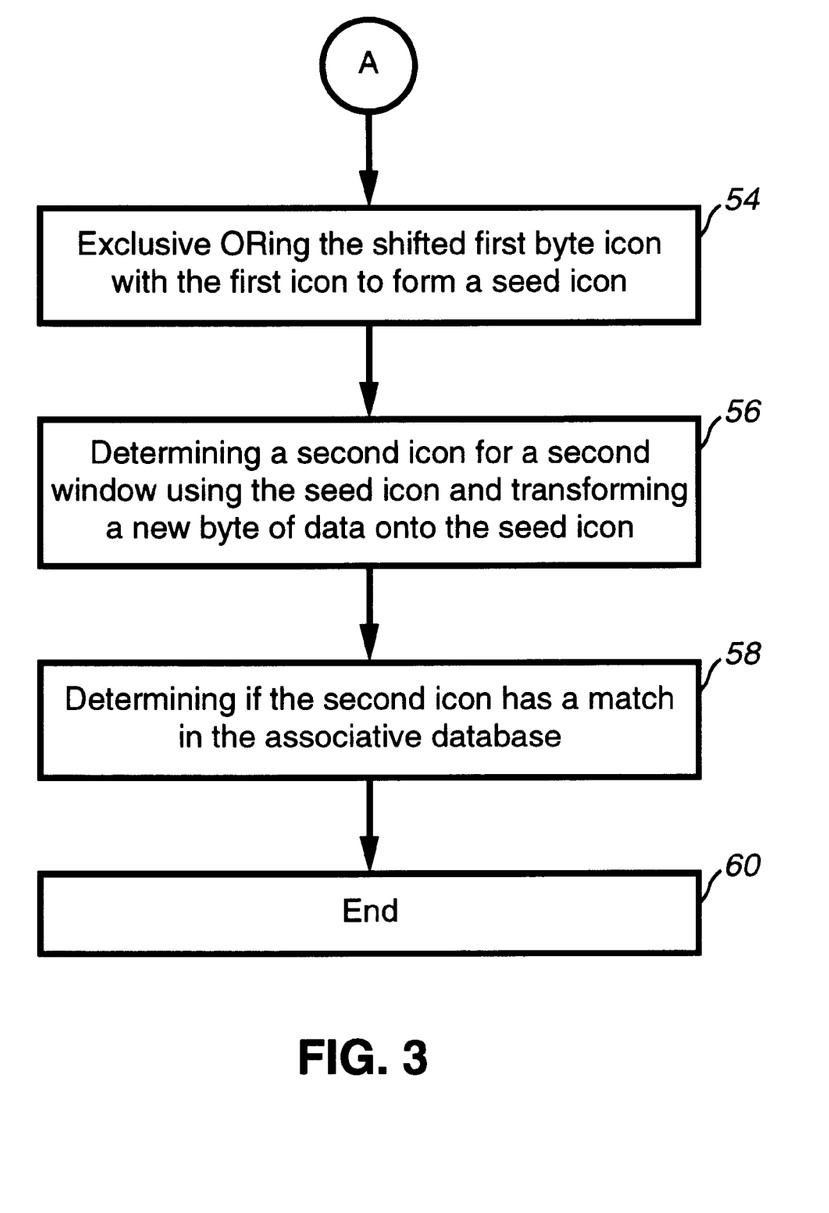

FIGS. 2 & 3 are a flow chart of the steps used in performing a sliding window search in accordance with one embodiment of the invention. The process starts, step 40, by creating an associative database of a plurality of data strings at step 42. A first window of a data block is received at step 44. The first window of the data block is iconized to form a first icon at step 46. Next it is determined if the first icon has a match in the associative database at step 48. A first byte icon is determined for the a first byte of data in the first window at step 50. An icon shift function is executed to form a first byte icon at step 52. The shifted first byte icon is exclusive ORed with the first icon to form a seed icon at step 54. A second icon is determine for a second window using the seed icon and transforming a new byte of data onto the seed icon at step 56. At step 58 it is determined if the second icon has a match in the associative database which ends the process at step 60. The process just repeats until the whole block of data has been analyzed for matches. Note the process described above assumes that second window has been shifted one byte from the first window. It will be apparent to those skilled in the art the process can be easily modified to work for shifts of one bit to many bytes. The process described above also assumes that the window is larger than a single byte. However, the process would work for a single byte.

In another embodiment, the process first determines if a single search window size is required. When only a single window search size is required an icon is determined for each of the plurality of data strings. When more than a single window search size is required, a minimum length search window is determined. Next an icon is calculated for each of a first plurality of data strings having a length equal to the minimum length, to form a plurality of first icons. The plurality of first icons are stored in the associative database. Next an icon is calculated for a first portion of each of a plurality of data strings, to form a plurality of second icons. The plurality of second icons are stored in the associative database. An icon is calculated for a second portion of each of the second plurality of data strings to form a plurality of third icons. The plurality of third icons are stored in the associative database. A pointer is stored with each of the second icons that points to the one of the plurality of third icons. Note that in one embodiment a match flag is stored at an address corresponding to the icons (first icons, second icons, third icons).

In another embodiment, when the process finds that the first icon is found in the associative database, it is determined if a pointer is stored with the first icon. When a pointer is not stored with the first icon, then a match has been found. When a pointer is stored with the first icon a next icon is determined. The next icon is the transform for the next non-overlapping window of the data block being searched. The next icon is compared to the an icon at the pointer location. When the next icon is the same as the icon at the pointer location a match has been found.

In another embodiment when the first icon is found in the associative database and includes a pointer, a second icon is determined. Next it is determined if the second icon has a matching the associative database. In another embodiment the second icon is determined using an icon append operation with a second portion to the first icon. The second portion is the next non-overlapping window of data in the data block being searched.

Figure 4:
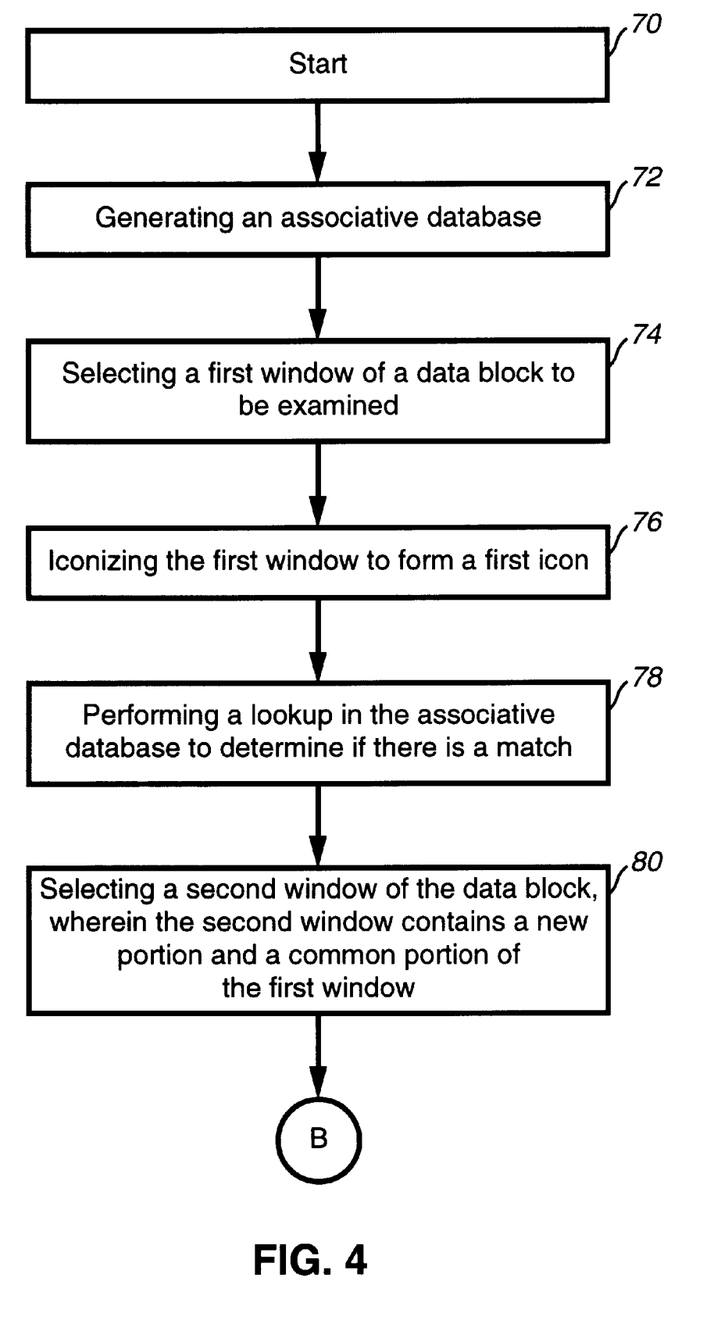
FIGS. 4 & 5 are a flow chart of the steps used in performing a sliding window search in accordance with another embodiment of the invention.
Figure 5:
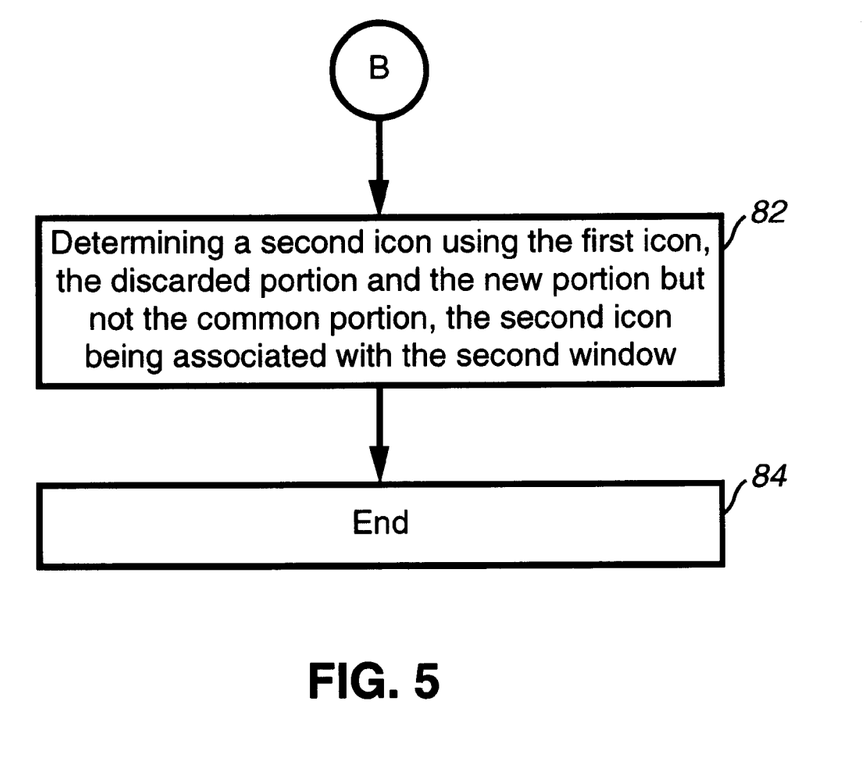

FIGS. 4 & 5 are a flow chart of the steps used in performing a sliding window search in accordance with another embodiment of the invention. The process starts, step 70, by generating an associative database at step 72. A first window of a data block is selected to be examined at step 74. The first window is iconized to form a first icon at step 76. A lookup in the associative database is performed to determine if there is a match at step 78. A second window of the data block is selected, wherein the second window contains a new portion and a common portion of the first window at step 80. A second icon is determined using the first icon, a discarded portion and the portion but not the common portion at step 82. The second icon is associated with the second window which ends the process at step 84. In one embodiment, this process is repeated until the complete data block has been examined. In another embodiment the process of forming an icon involves a linear feedback shift register operation. In another embodiment the linear feedback shift register operation is a cyclical redundancy code.

In another embodiment the process of forming the second icon includes determining a discarded icon for the discarded portion. Then an icon shift function is executed to form a shifted discarded icon. The shifted discarded icon is exclusive ORed with the first icon to form a seed icon. A new icon is determined for the new potion. The new icon is exclusive ORed with the seed icon to form the second icon.

In another embodiment the lookup process to determine if there is a match includes determining if the associative database indicates a match, a no match or a qualifier match. When a qualifier match is indicated, a next window icon for the next complete non-overlapping window of data is determined. Then it is determined if there is a pointer pointing from the first icon to the next window icon.

In another embodiment, when a qualifier match is indicated, a match length is determined. An extra portion is appended onto the first icon to form a second icon. Note the extra portion of the data plus the window of data that has been iconized is equal to the match length. Using the second icon it is determine if the associative database indicates a match.

Figure 6:
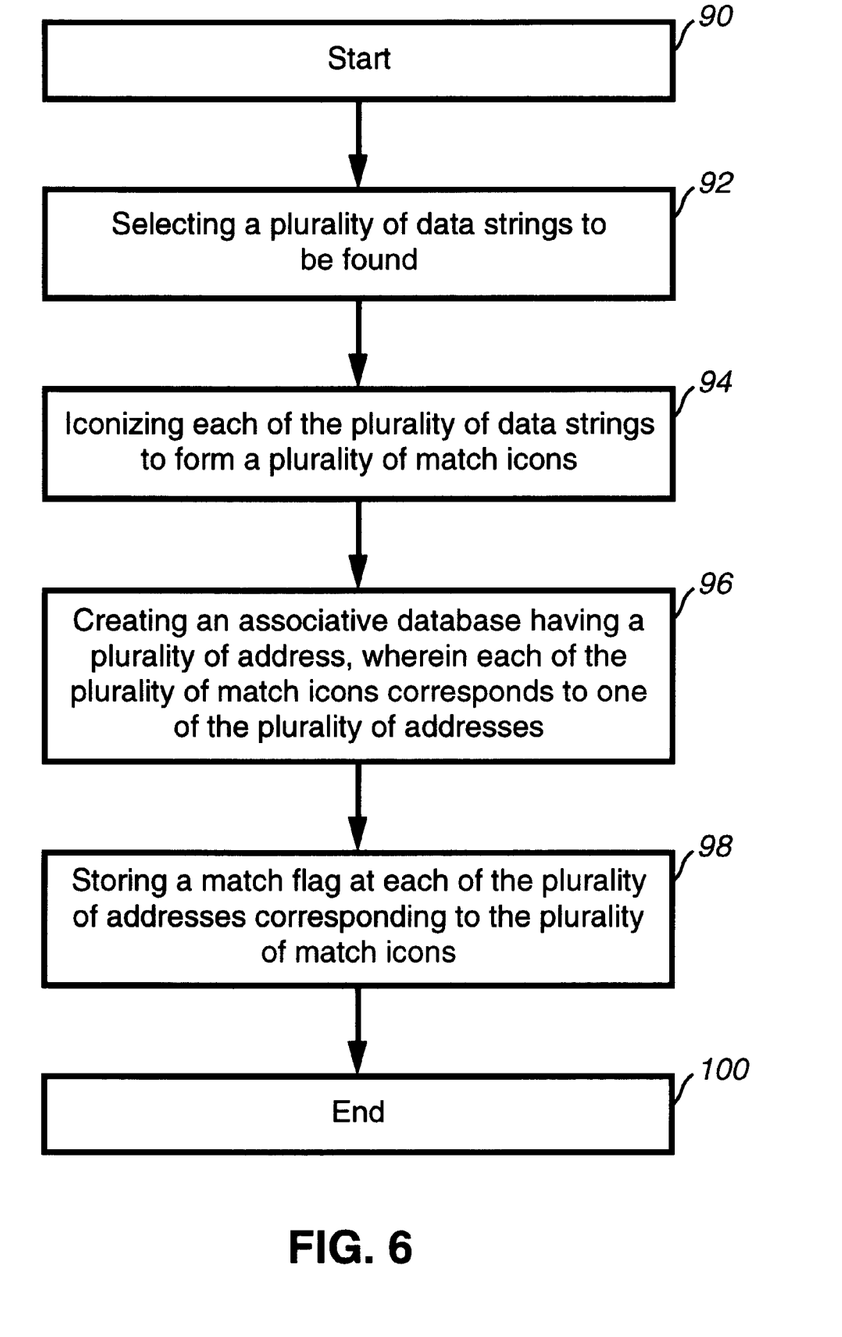
FIG. 6 is a flow chart of the steps used in performing a sliding window search in accordance with another embodiment of the invention.

FIG. 6 is a flow chart of the steps used in performing a sliding window search in accordance with another embodiment of the invention. The process starts, step 90, by selecting a plurality of data strings to be found at step 92. The plurality of data strings are iconized to form a plurality of match icons at step 94. An associative database is created having a plurality of icons, wherein each of the match icons corresponds to one of the plurality of addresses at step 96. At step 98, a match flag is stored at each of the plurality of addresses corresponding to the plurality of match icons which ends the process at step 100. When the plurality of data strings do not all have a same length a plurality of shortest data strings are selected. A plurality of short icons associated with the shortest data strings are determined. The match indicator is stored in the associative database at the address associated with each of the short icons. A plurality of qualifier icons are determined for a first portion of a plurality of longer data strings. A qualifier flag is stored in the associative database for each of the qualifier icons. A match length indicator is stored with each of the qualifier icons in the associative database. An icon is determined for a first window of a data block, wherein the first window has a window length equal to a shortest length. A lookup is performed in the associative database to determine if there is a match flag or a qualifier flag. When there is a qualifier flag, the match length indicator is retrieved. A complete icon is determined for the portion of the data block equal to the match length. A lookup is performed to determine if there is a match flag associated with the complete icon.

Figure 7:
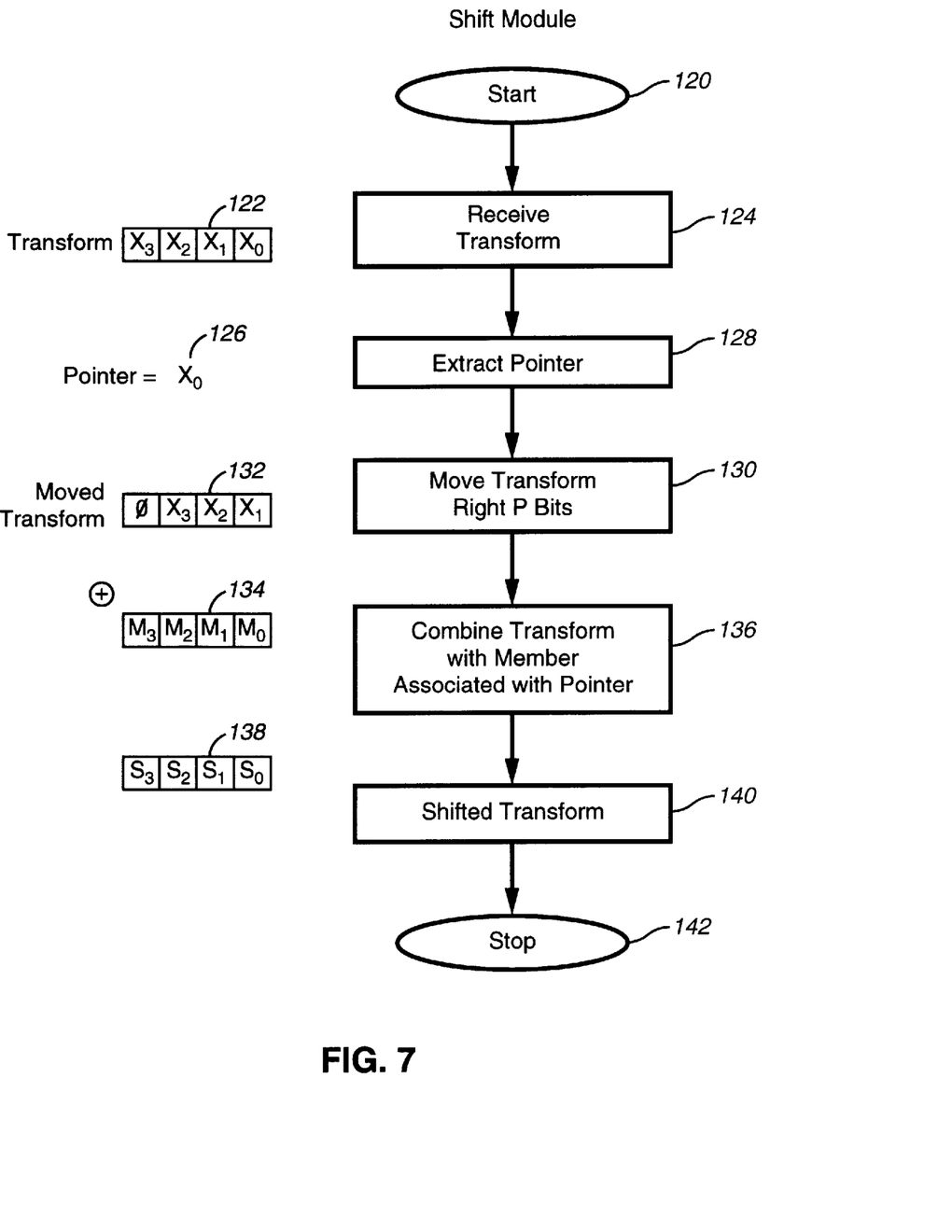
FIG. 7 is a flow chart of the steps used in an icon shift function in accordance with one embodiment of the invention.

The following figures explain the "icon algebra" used in implementing the invention. FIG. 7 is a flow chart of the steps used in an icon shift function in accordance with one embodiment of the invention. The shift module determines the transform for a shifted message (i.e., "A0" or $X^z A(x)$).

Where $X^z$ means the function is shifted by z places (zeros) and A(x) is a polynomial function. The process starts, step 120, by receiving the transform 122 to be shifted at step 124. Next the a pointer 126 is extracted at step 128. The transform 122 is then moved right by the number of bits in the pointer 126, at step 130. This forms a moved transform 132. Note the words right and left are used for convenience and are based on the convention that the most significant bits are placed on the left. When a different convention is used, it is necessary to change the words right and left to fit the convention. Next the moved transform 132 is combined (i.e., XOR'ed) with a member 134 associated with the pointer 126, at step 136. The member associated with the pointer is found in a transform look table, like the one shown in FIG. 11. Note that this particular lookup table is for a CRC-32 polynomial code, however other polynomial codes can be used and they would have different lookup tables. This forms the shifted transform 138 at step 140, which ends the process at step 142. Note that if the reason for shifting a first transform is to generate a first-second transform then first transform must be shifted by the number of bits in a second data string. This is done by executing the shift module X times, where X is equal to the number of data bits in the second data string divided by the number of bits in the pointer. Note that another way to implement the shift module is to use a polynomial generator. The first transform 122 is placed in the intermediate remainder register. Next a number of logical zeros (nulls) equal to the number of data bits in second data string are processed.

Figure 8:
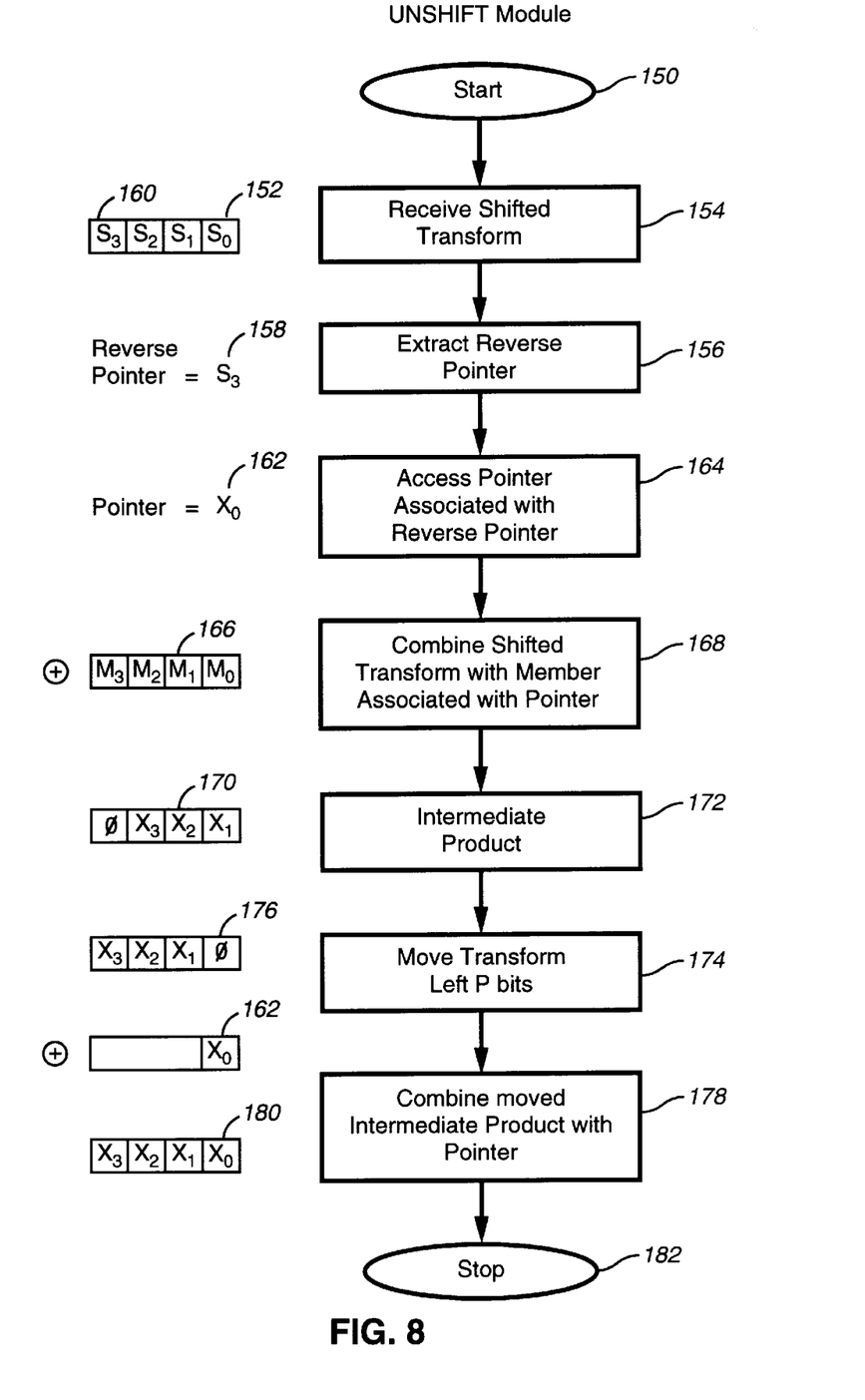
FIG. 8 is a flow chart of the steps used in an icon unshift function in accordance with one embodiment of the invention.

FIG. 8 is a flow chart of the steps used in an icon unshift function in accordance with one embodiment of the invention. An example of when this module is used is when the transform for the data string "AB" is combined with the transform for the data string "B". This leaves the transform for the data string "A0" or $X^z A(x)$. It is necessary to "unshift" the transform to find the transform for the data string "A". The process starts, step 150, by receiving the shifted transform 152, at step 154. At step 156 a reverse pointer 158 is extracted. The reverse pointer 158 is equal to the most significant portion 160 of the shifted transform 152. The reverse pointer 158 is associated with a pointer 162 in the reverse look up table (e.g., see FIG. 12) at step 164. Next, the member 166 associated with the pointer 162 in the table of FIG. 11 for example, is combined with the shifted transform at step 168. This produces an intermediate product 170, at step 172. At step 174 the intermediate product 170 is moved left to form a moved intermediate product 176. The moved intermediate product 176 is then combined with the pointer 162, at step 178, to form the transform 180, which ends the process, step 182. Note that if the number of bits in the "B" data string (z) is not equal to the number of bits in the pointer then the unshift module is executed X times, where X=z/(number of bits in pointer).

Figure 9:
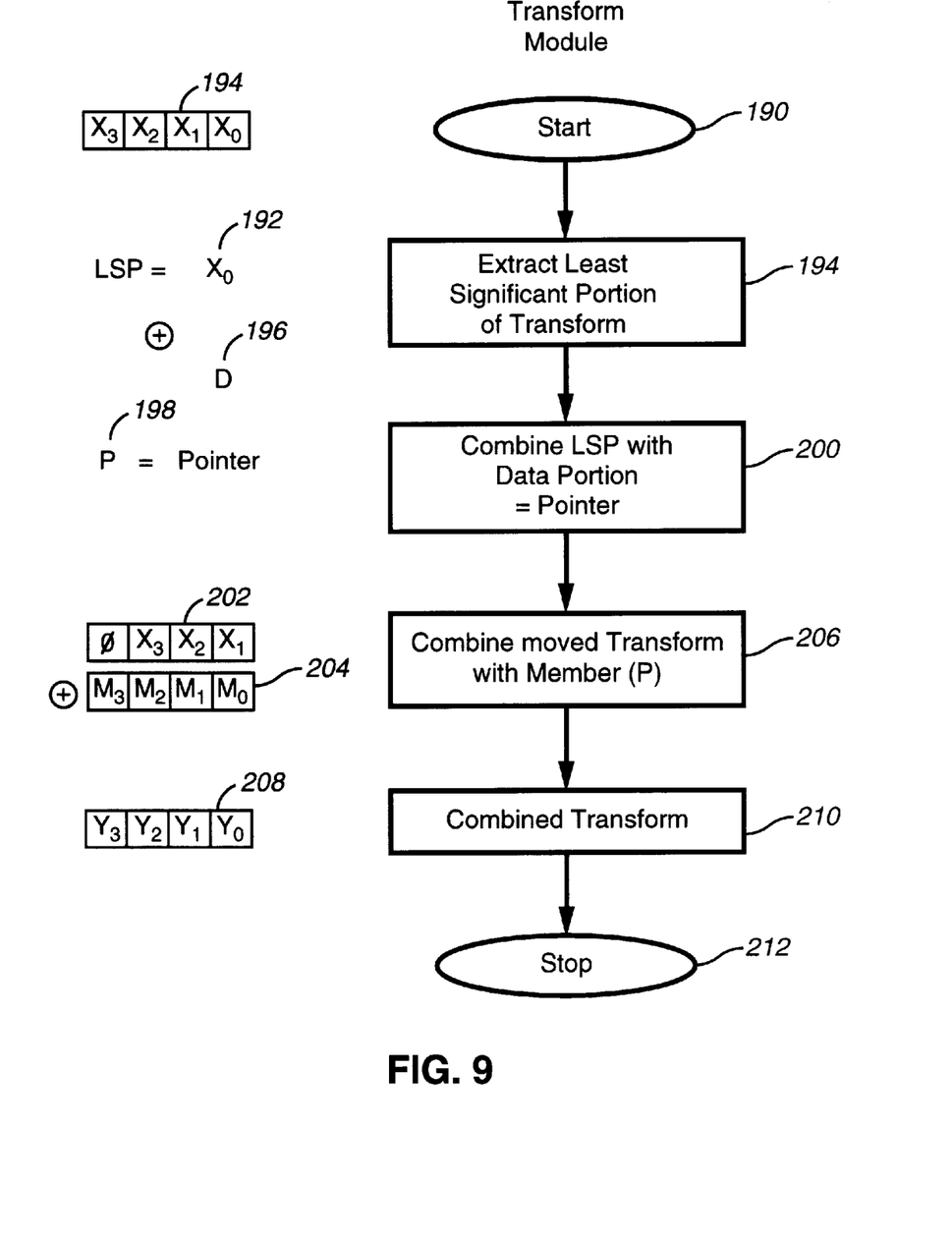
FIG. 9 is a flow chart of the steps used in a transform function in accordance with one embodiment of the invention.

FIG. 9 is a flow chart of the steps used in a transform function in accordance with one embodiment of the invention. The transform module can determine the first-second transform for a first-second data string given the first transform and the second data string, without first converting the second data string to a second transform. The process starts, step 190, by extracting a least significant portion 192 of the first transform 194 at step 194. This is combined with the second data string 196 to form a pointer 198, at step 200. Next a moved first transform 202 is combined with a member 204 associated with the pointer in the look up table (e.g., FIG. 11), at step 206. A combined transform 208 is created at step 210 which ends the process, step 212. Note that if the pointer is one byte long then the transform module can only process one byte of data at a time. When the second data string is longer than one byte then the transform module is executed one data byte at a time until all the second data string has been executed. In another example assume that first transform is equal to all zeros (nulls), then the combined transform is just the transform for the second data string. In another embodiment the first transform could be a precondition and the resulting transform would be a precondition-second transform. In another example, assume a fourth transform for a fourth data string is desired. A first data portion (e.g., byte) of the fourth data string is extracted. This points to a member in the look up table. When the fourth data string contains more than the first data portion, the next data portion is extracted. The next data portion is combined with the least significant portion of the member to form a pointer. The member is then moved right by the number of bits in the next data portion to form a moved member. The moved member is combined with a second member associated with the pointer. This process is repeated until all the fourth data string is processed.

Figure 10:
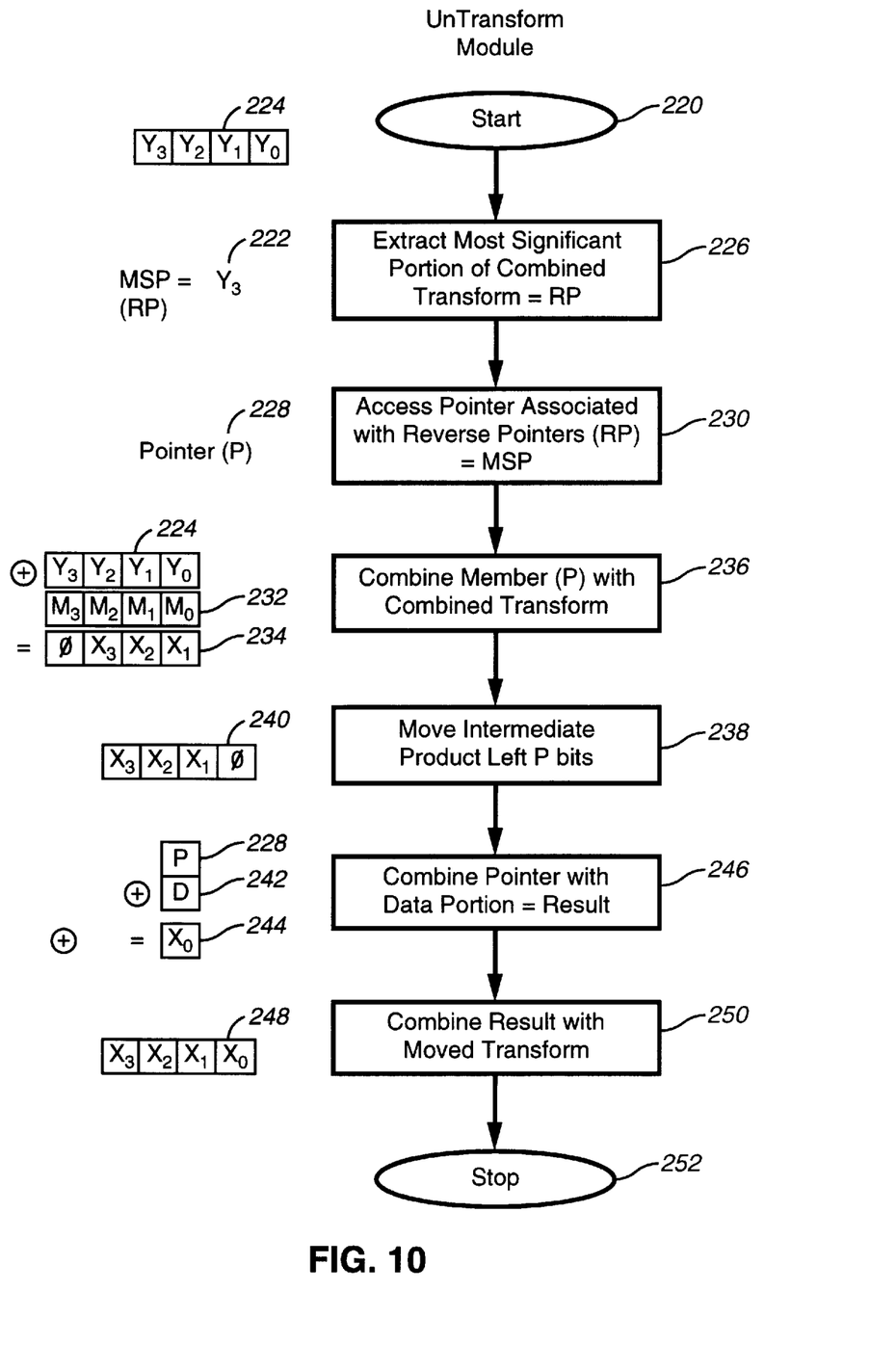
FIG. 10 is a flow chart of the steps used in an untransform function in accordance with one embodiment of the invention.

FIG. 10 is a flow chart of the steps used in an untransform function in accordance with one embodiment of the invention. The untransform module can determine the first transform for a first data string given the first-second transform and the second data string. The process starts, step 220, by extracting the most significant portion 222 of the first-second transform 224 at step 226. The most significant portion 222 is a reverse pointer that is associated with a pointer 228 in the reverse look-up table. The pointer is accessed at step 230. Next the first-second transform 224 is combined with a member 232 associated with the pointer to form an intermediate product 234 at step 236. The intermediate product is moved left by the number of bits in the pointer 228 at step 238. This forms a moved intermediate product 240. Next the pointer 228 is combined with the second data string 242 to form a result 244 at step 246. The result 244 is combined with the moved intermediate product 240 to form the first transform 248 at step 250, which ends the process at step 252. Again this module is repeated multiple times if the second data string is longer than the pointer.

Some examples of what the transform module 100 can do, include determining a second-third transform from a first-second-third transform and a first transform. The first transform is shifted by the number of data bits in the second-third data string. The shifted first transform is combined with the first-second-third transform to form the second-third transform. In another example, the transform generator could determine a first-second-third-fourth transform after receiving a fourth data string. In one example, the transform module would first calculate the fourth transform (using the transform module). Using the shift module the first-second-third transform would be shifted by the number of data bits in the forth data string. Then the shifted first-second-third transform is combined, using the combiner, with the fourth transform.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of performing a sliding window search, comprising the steps of:
    (a) creating an associative database of a plurality of data strings;
    (b) receiving a first window of a data block;
    (c) iconizing the first window of the data block to form a first icon;
    (d) determining if the first icon has a match in the associative database;
    (e) determining a first byte icon of a first byte of data in the first window;
    (f) executing an icon shift function to form a shifted first byte icon;
    (g) exclusive ORing the shifted first byte icon with the first icon to form a seed icon;
    (h) determining a second icon for a second window using the seed icon and transforming a new byte of data onto the seed icon;
    and
    (i) determining if the second icon has a match in the associative database.

2. The method of claim 1, wherein step (a) further includes the steps of:
    (a1) determining if a single search window size is required;
    (a2) when the single search window size is required, determining an icon for each of the plurality of data strings.

3. The method of claim 2, further including the steps of:
    (a3) when more than the single search window size is required, determining a minimum length search window;
    (a4) determining an icon for each of a first plurality of data strings having a length equal to the minimum length to form a plurality of first icons;
    (a5) storing the plurality of first icons in the associative database.

4. The method of claim 3, further including the steps of:
    (a6) determining an icon for a first portion of each of a second plurality of data strings to form a plurality of second icons;
    (a7) storing the plurality of second icons in the associative database.

5. The method of claim 4, further including the steps of:
    (a8) determining an icon for a second portion of each of the second plurality of data strings to form a plurality of third icons;
    (a9) storing the plurality of third icons in the associative database;
    (a10) storing a pointer with each of the plurality of second icons, the pointer pointing to one of the plurality of third icons.

6. The method of claim 5, wherein step (d) further includes the steps of:
    (d1) when the first icon is found in the associative database, determining if the pointer is stored with the first icon;
    (d2) when the pointer is not stored with the first icon, determining the match has been found.

7. The method of claim 6, further including the steps of:
    (d3) when the pointer is stored with the first icon, determining a next icon;

(d4) comparing the next icon to an icon at a pointer location;

(d5) when the next icon is the same as the icon at the pointer location, determining the match has been found.

8. The method of claim 3, further including the steps of:

(d1) when the first icon is found in the associative database and includes a pointer, determining a second icon;

(d2) determining if the second icon has a match in the associative database.

9. The method of claim 8, wherein the step of determining a second icon includes performing an icon append operation with a second portion to the first icon.

10. A method of performing a sliding window search, comprising the steps of:

(a) generating an associative database;

(b) selecting a first window of a data block to be examined;

(c) iconizing the first window to form a first icon;

(d) performing a lookup in the associative database to determine if there is a match;

(e) selecting a second window of the data block, wherein the second window contains a new portion and a common portion of the first window;

(f) determining a second icon using the first icon, a discarded portion and the new portion but not the common portion, the second icon being associated with the second window; and (g) performing a lookup in the associative database using the second icon to determine if there is a match.

11. The method of claim 10, further including the step of:

(h) returning to step (d).

12. The method of claim 10, wherein step (c) further includes the step of:

(c1) performing a linear feedback shift register operation on the first window to create the first icon.

13. The method of claim 12, wherein the step of performing the linear feedback shift register operation is a cyclical redundancy code.

14. The method of claim 10, wherein step (f) further includes the steps of:

(f1) determining a discarded icon for the discarded portion;

(f2) executing an icon shift function to form a shifted discarded icon;

(f3) exclusive ORing the shifted discarded icon with the first icon to form a seed icon.

15. The method of claim 14, further including the steps of:

(f4) determining a new icon for the new portion;

(f5) exclusive ORing the new icon with the seed icon to form the second icon.

16. The method of claim 10, wherein step (d) further includes the steps of:

(d1) determining if the associative database indicates a match, a no match or a qualifier match;

(d2) when a qualifier match is indicated, determining a next window icon for a next complete non-overlapping window of the data block;

(d3) determining if there is a link pointer, pointing from the first icon to the next window icon.

17. The method of claim 10, wherein step (d) further includes the steps of:

(d1) determining if the associative database indicates a match, a no match or a qualifier match;

(d2) when a qualifier match is indicated, determining a match length;

(d3) appending an extra portion onto the first icon to form a second icon;

(d4) determining if the associative database indicates a match.

18. A method of performing a sliding window search, comprising the steps of:

(a) selecting a plurality of data strings to be found;

(b) iconizing each of the plurality of data strings to form a plurality of match icons;

(c) creating an associative database having a plurality of addresses, wherein each of the plurality of match icons corresponds to one of the plurality of addresses; and (d) storing a match flag at each of the plurality of addresses corresponding to the plurality of match icons.

19. The method of claim 18, further including the steps of:

(e) when the plurality of data strings do not all have a same length, selecting a plurality of shortest data strings;

(f) determining a plurality of short icons and storing a match indicator in the associative database;

(g) determining a plurality of qualifier icons for a first portion of a plurality of longer data strings;

(i) storing a qualifier flag for each the plurality of qualifier icons in the associative database.

20. The method of claim 19, further including the step of:

(j) storing a match length indicator at each of the plurality of qualifier icons in the associative database.

21. The method of claim 20, further including the steps of:

(k) determining an icon for a first window of a data block, wherein the first window has a window length equal to a shortest length;

(l) performing a lookup in the associative database to determine if there is the match flag or the qualifier flag;

(k) when there is the qualifier flag, retrieving the match length indicator;

(l) determining a complete icon for a portion of the data block equal to the match length;

(m) performing a lookup in the associative database to determine if there is a match flag associated with the complete icon.

* * * * *